United States Patent
Zhao et al.

(10) Patent No.: US 10,675,843 B2
(45) Date of Patent: Jun. 9, 2020

(54) AQUEOUS PRIMER COMPOSITION FOR ADHESIVE BONDING AND BONDING METHOD USING THE SAME

(71) Applicant: Cytec Industries Inc., Princeton, NJ (US)

(72) Inventors: Yiqiang Zhao, Newark, DE (US); Dalip Kumar Kohli, Churchvilles, MD (US)

(73) Assignee: Cytec Industries Inc., Princeton, NJ (US)

( * ) Notice: Subject to any disclaimer, the term of this patent is extended or adjusted under 35 U.S.C. 154(b) by 0 days.

(21) Appl. No.: 15/856,997

(22) Filed: Dec. 28, 2017

(65) Prior Publication Data

US 2018/0186124 A1    Jul. 5, 2018

Related U.S. Application Data

(60) Provisional application No. 62/440,258, filed on Dec. 29, 2016.

(51) Int. Cl.
| | | |
|---|---|---|
| *B32B 15/092* | (2006.01) | |
| *C09D 163/00* | (2006.01) | |
| *C08K 3/04* | (2006.01) | |
| *B32B 27/38* | (2006.01) | |
| *C09J 5/02* | (2006.01) | |
| *C09J 5/06* | (2006.01) | |

(52) U.S. Cl.
CPC ............ *B32B 15/092* (2013.01); *B32B 27/38* (2013.01); *C08K 3/041* (2017.05); *C09D 163/00* (2013.01); *C09J 5/02* (2013.01); *C09J 5/06* (2013.01); *C09J 2463/003* (2013.01)

(58) Field of Classification Search
CPC .................................................. B32B 15/092
See application file for complete search history.

(56) References Cited

U.S. PATENT DOCUMENTS

| | | | |
|---|---|---|---|
| 2015/0096680 A1* | 4/2015 | Zhao | .......................... C09J 7/50 |
| | | | 156/330 |
| 2015/0232998 A1* | 8/2015 | Colominas Tutusaus | .................... |
| | | | C23F 13/14 |
| | | | 428/313.9 |

FOREIGN PATENT DOCUMENTS

| | | | | |
|---|---|---|---|---|
| WO | 20050071021 A1 | 8/2005 | | |
| WO | WO-2005071021 A1 * | 8/2005 | ............. | C09D 5/084 |
| WO | 20090078373 A1 | 6/2009 | | |

* cited by examiner

*Primary Examiner* — Daniel H Lee
(74) *Attorney, Agent, or Firm* — Thi Dang

(57) ABSTRACT

A water-based bonding primer composition and a method of applying the same onto a metallic surface prior to adhesive bonding. The bonding primer composition is a water-based dispersion containing water, one or more epoxy resins, at least one curing agent, a silane compound, a low amount of a carbon-based material in particulate form, and optional additives. The carbon-based material is selected from graphene, graphene oxide (GO), graphite, carbon with various structures in micron-scale or nanoscale size, and combination thereof.

10 Claims, 1 Drawing Sheet

Formulation 1

Formulation 2

AQUEOUS PRIMER COMPOSITION FOR ADHESIVE BONDING AND BONDING METHOD USING THE SAME

The instant application claims the benefit of prior U.S. Provisional Application No. 62/440,258 filed on Dec. 29, 2016, which is incorporated herein by reference.

The present disclosure generally relates to bonding methods and primer compositions for use in such bonding methods.

DETAILED DESCRIPTION

Figure 1A:
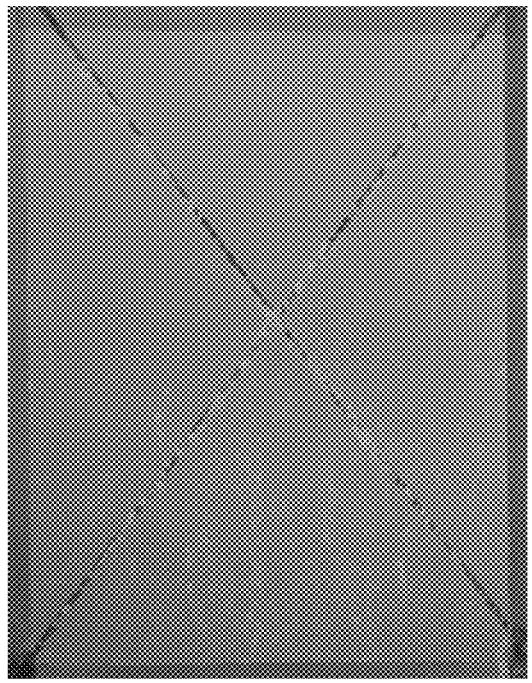
FIGS. 1A and 1B show the results of a 3000-hour scribe corrosion test (ASTM D1654), comparing the performance of a graphene-containing primer coating (Formulation 2) with that of a control primer coating without graphene (Formulation 1).

In the manufacture of composite structures, particularly in the aerospace and automotive industries, it is conventional to bond a fabricated metallic structure to metallic or composite adherends or to laminate one or more prepreg plies of resin-impregnated fibrous reinforcement to the fabricated metallic structure utilizing structural adhesives. Bonding typically requires curing the structural adhesives after the structures are joined. In general, to ensure the greatest level of adhesive strength, the metal surface(s) are scrupulously cleaned of dirt, soil, grease, and metal oxidation products immediately prior to bonding. Unfortunately, this procedure cannot be generally used most times as the cleaning and bonding operations are often separated by long periods of inactive time. During such periods, the metal surface may become hydrolyzed, lessening the adhesive strength of the bond. A solution to overcome this difficulty is to apply a primer on the cleaned metal surface(s) prior to adhesive bonding.

A consideration in the use of primers is the durability and corrosion resistance of the joints formed between the metal surface and the material bonded to the metal surface. This is particularly important in structural applications, such as aircraft structures, because these joints are exposed to a wide range of environmental conditions with extreme temperatures, high humidity, and highly corrosive marine environments. To avoid the failure of the joints as well as to meet stringent commercial passenger and cargo aircraft standards, the adhesive-bonded joints of the structural components must withstand harsh environmental conditions, and, in particular, resistance to corrosion and disbanding in humid, salt-laden environments, especially those resulting from sea spray or de-icing materials. Failure of these joints often starts with diffusion of water through the adhesive followed by corrosion of the underlying metal structure.

Historically, chromated primers (i.e., solutions containing chromium ions) have been used to protect metals from corrosion. However, due to environmental regulations, the use of chromates is restricted, particularly in the aerospace industries. Several non-chromated corrosion inhibitors such as zinc phosphosilicates, molybdenum zinc phosphate, calcium borosilicate, sodium vanadate, strontium phosphate etc. have been under evaluation. Most of these inhibitors are passive and provide corrosion protection by sacrificial oxidation method. As such, these passive inhibitors do not provide the desired durability or performance required when exposed to harsh environmental conditions.

A bonding primer composition is disclosed herein that can provide corrosion protection without the use of chromate corrosion inhibitors. More specifically, the bonding primer composition is a water-based (or aqueous) dispersion containing water, one or more epoxy resins, one or more curing agents, a silane compound, a low amount of carbon-based material in particulate form, and optional additives. The carbon-based material is selected from graphene, graphene oxide (GO), graphite, and carbon with various structures in micron-scale or nanoscale size. Particularly suitable are graphene in the form of nano-sized platelets in dry powders or wet suspensions. Also suitable are graphite particles, carbon black particles, and carbon nanotubes. Generally, the solid content of the aqueous composition may be from about 10% to about 30%, and the amount of carbon-based material is less than 5% by weight (or wt. %) based on the total weight of solids in the aqueous composition.

According to one embodiment, the bonding primer composition is an aqueous dispersion containing: (i) one or more thermosettable resins, (ii) curing agent(s), optionally, catalyst(s), (iii) a silane compound, (iv) a low amount of graphene, and (v) water. The amount of graphene, in weight percentage, is less than 5 wt. %, for example, within the range of 0.1 wt. % to 2 wt. %, based on the total weight of solid components in the composition, or alternatively, based on the combined weight of components (i), (ii) and (iv).

The graphene nano-sized platelets ("nanoplatelets") are planar structures having a thickness of up to 50 nm. Such platelets may have planar dimensions (e.g., length and/or width) in the range of 0.1 to 100 µm. Each platelet consists essentially of one or more graphene sheets. The graphene nanoplatelets may have some oxygen content of 1%-20% from functional groups on the surface. The oxygen content can be determined by X-ray photoelectron spectroscopy (XPS).

In another embodiment, the same aqueous primer composition contains carbon black particles or carbon nanotubes instead of graphene platelets. The amount of carbon particles or nanotubes is less than 5 wt. % based on the total weight of solids in the composition, for example, within the range of 0.1 wt. % to 3 wt. %.

The term "particles" as used herein encompass particulate materials of various shapes including, but are not limited to, spherical and non-spherical particles such as flakes and rods. The carbon black particles may have a particle size d90 of up to 100 µm as determined by laser light scattering/diffraction technique. For example, the particle size may be determined by Malvern Mastersizer 2000 or HORIBA Laser Scattering Particle Size Distribution Analyzer LA-960. "d90" represents particle size distribution in which 90% of the particles in the tested sample have size of less than the stated value.

Carbon nano-tubes (CNTs) are tubular, strand-like structures having external diameters in the range of 0.4 nm to about 100 nm, preferably, the external diameter is less than 50 nm, and more preferably, less than 25 nm. The CNTs may be of any chirality. Armchair nanotubes are contemplated. Moreover, the CNTs may be semiconducting nanotubes or any other type that displays electrical conductivity. Suitable CNTs may include single-walled carbon nano-tubes (SW-CNTs), double-walled carbon nanotubes (DWCNTs) and multi-walled carbon nanotubes (MWCNTs).

Suitable graphite may be in the form of micron-sized or nano-sized particles or flakes. The term "nano-sized" refers to sizes in the nanometer range that are less than 1 micron.

Preferably, the graphite is flake graphite. Suitable graphite particles may have a particle diameter (d90) of no greater than about 100 μm, preferably no greater than about 50 μm. The particle diameter (d90) can be determined by laser light scattering or diffraction technique. For graphite flakes, the flakes may have thickness of from about 20 μm to about 100 μm, and planar dimensions (length and/or width) of from about 0.1 μm to about 100 μm. The graphite may have some oxygen content of 1%-20% from functional groups on the surface.

To enhance film formation, the aqueous primer composition may further contain a low amount of propylene carbonate, preferably, less than 15% by weight based on the total weight of the primer composition. The presence of propylene carbonate enhances film formation of the primer composition by enabling the formation of a smooth, continuous primer film that is scratch and rub resistant before cure and solvent-wipe resistant after cure.

It has been found that increasing loading level of conventional corrosion inhibitors in particulate/powder form is often required for long term corrosion protection, which consequently tends to affect negatively the toughness of the primer coating, thereby resulting in lower mechanical performance in toughness-sensitive testing such as floating roller peel test at −67° F. or wedge crack test (ASTM D 3762). Due to the unique morphology of the nano-sized or micron-sized graphene and other carbon materials disclosed herein and/or their compatibility with the epoxy-based resin in the primer formulation, the incorporation of a relatively small amount of such graphene/carbon materials produces a synergy with the epoxy-based component such that an improvement in corrosion resistance can be achieved without compromising the aforementioned mechanical performance.

The primer composition can be used in a bonding method which includes applying the aqueous bonding primer composition onto a metallic surface of a first substrate prior to adhesively bonding the substrate to another substrate. The second substrate may be a structure with a metallic surface or a non-metallic surface. For example, the second substrate may be a metal layer or structure or a composite structure composed of reinforcement fibers embedded in a polymer or matrix resin.

For adhesive bonding of a metallic substrate to another substrate (metal or composite substrate), the aqueous primer composition of the present disclosure may be applied onto a metallic surface by spraying or brushing to form a curable primer film. The metallic surface is preferably pre-treated prior to applying the primer composition in order to enhance the adhesion of the metallic surface to the subsequently applied primer film and to provide corrosion resistance to the metal surface. The primer film is cured in an oven at an elevated temperature (e.g. 250° F. or 350° F. for one hour) prior to bonding the assembly. The primed surface of the metallic substrate is then adhered to the second substrate by providing a curable adhesive film between the primed surface and the second substrate. The second substrate may be another metallic substrate or a composite substrate composed of reinforcement fibers embedded in or impregnated with a matrix resin. The adhesive may be applied onto a surface of the second substrate, or alternatively, the adhesive may be applied onto the primed surface of the first substrate. The resulting assembly is then subjected to curing at an elevated temperature to cure the adhesive, and consequently, to produce a bonded structure. Curing may be carried out by applying heat and pressure to the assembly. The primer composition is formulated so that it can be compatible with conventional curable adhesives (particularly, epoxy-based adhesives) that are curable at temperatures within the range of 250° F. to 350° F. (121° C. to 177° C.).

The term "substrate" as used herein includes a single layer, a multilayered laminate and structures of any shape and configuration.

The terms "cure" and "curing" as used herein refer to the hardening of a material by molecular cross-linking brought about by chemical reaction, ultraviolet radiation or heat. Materials that are "curable" are those capable of being cured, i.e. becoming harden.

When the second substrate is a composite substrate composed of reinforcement fibers embedded in a matrix resin or polymer. The matrix resin or polymer of the composite substrate may be uncured, partially or fully cured. When the composite substrate is uncured or only partially cured prior to the adhesive joining of the two substrates, full curing of the composite substrate occurs simultaneously with the curing of the adhesive during the bonding stage.

The primer composition may be applied (e.g. by spraying) to the metallic surface in several layers until a desired film thickness is achieved. For example, the amount of primer composition is applied so that the cured primer film may have a thickness from about 0.0001 inch to about 0.0003 inch (or 0.1 mil to 0.3 mil).

To enhance the adhesion of the metallic surface to the subsequently applied polymeric primer film, the metallic surface may be pre-treated prior to applying the primer compositions thereon. Suitable surface treatments include wet etching, anodization such as phosphoric acid anodization (PAA), and phosphoric acid/sulfuric acid anodization (PSA), and sol-gel processes that are known to those skilled in the art. A more specific example of a suitable surface treatment is ASTM D2651, which includes cleaning with a soap solution, followed by wet etching and then anodizing with an acid. The water-based primer composition disclosed herein is formulated to be compatible with these various surface treatments.

PAA typically involves using phosphoric acid (e.g. ASTM D3933) to form metal oxide surfaces, and PSA typically involves using phosphoric-sulphuric acid to form metal oxide surfaces. Anodizing produces a porous, rough surface into which the primer composition can penetrate. Adhesion results primarily from mechanical interlocking between the rough surface and the primer film.

Sol-gel process typically involves the growth of metal-oxo polymers through hydrolysis and condensation reactions of an aqueous solution of organo-functional silane and zirconium alkoxide precursors to form inorganic polymer networks on the metal surface. The sol-gel coating can provide good adhesion between the metal surface and the subsequently-applied primer film via covalent chemical bonding.

Thermosettable Resins

The preferred thermosettable resins are epoxy resins. Suitable epoxy resins include multifunctional epoxy resins having functionality of at least about 1.8, or at least about 2 functionalities. The epoxy resins are optionally chain-extended, solid glycidyl ethers of phenols, such as resorcinol and the bisphenols, e.g., bisphenol A, bisphenol F, and the like. Also suitable are the solid glycidyl derivatives of aromatic amines and aminophenols, such as N,N,N',N'-tetraglycidyl-4,4'-diaminodiphenylmethane. Moreover, the epoxy resins may have an epoxy equivalent weight (EEW) of about 145-5000, with an equivalent weight of about 300-750 being preferred, and an equivalent weight of 325 being most preferred.

The epoxy resins may be in solid form, or a dispersion of solid epoxy. The epoxy resin in dispersed phase may be a dispersion of more than one epoxy resin in the form of a mixture of distinct particles, or may consist of only one type of particles containing more than one epoxy resin per particle. Thus, a flexibilizing epoxy such as the higher molecular weight bisphenol A or bisphenol F epoxies may be blended with a high-temperature resistant epoxy such as tetraglycidyl methylene dianiline (TGMDA), then the mixture is cooled, ground, or otherwise dispersed into solid particles of the requisite size. These same epoxy resins might be advantageously dispersed separately without blending.

A mixture of different epoxy resins may be used. In one embodiment, the mixture of epoxy resins includes novolac epoxy resin and diglycidyl ether of bisphenol A ("DGEBA") resin. Examples include novolac epoxy resins such as Epirez 5003 available from Huntsman, and bisphenol A epoxy resins such as XU-3903 available from Huntsman and D.E.R. 669 available from Dow Chemical Co. In another embodiment, the resin mixture contains an epoxy resin having a functionality of about 4 or less, and an epoxy resin having a functionality of about 5 or more. The use of higher functionality epoxy resins, i.e., epoxy resins having a functionality of five or more, in minor amounts is suitable, for examples less than 40 wt. % based on the sum of the weights of all epoxy resins in the composition. The use of such higher functionality epoxy resins in such minor amounts has been found to increase the solvent resistance of the cured primer composition without substantially lowering the adhesive properties.

In one embodiment, the primer composition includes a mixture of the following epoxy resins:

1) from 30 to 70 wt. % of an epoxy resin having a functionality of from about 1.8 to about 4 and an epoxy equivalent weight of from about 400 to about 800;

2) from 5 to 20 wt. % of an epoxy resin having a functionality of from about 1.8 to about 4 and an epoxy equivalent weight of from about 2000 to about 8000; and 3) from 10 to 40 wt. % of an epoxy resin having a functionality of about 5 or more and having an epoxy equivalent weight of from about 100 to about 400, wherein the weight percentages totaling 100% based on total weight of the epoxy mixture.

The total amount of epoxy resin(s) may be about 20%-60% by weight based on total weight of the primer composition.

Curing Agents and Catalysts

The water-based primer composition contains one or more curing agents and/or catalysts which may be water-soluble or water-insoluble. Suitable curing agents include a water-soluble, substituted amino triazine such as 2-β-(2'-methylimidazolyl-1'1-ethyl-4,5-diamino-s-triazine (which is commercially available as CUREZOL 2 MZ-Azine®); a modified polyamine, e.g. Ancamine 2014®; dicyandiamide (DICY), or a water-insoluble curing agent such as a bisurea based curing agent (such as Omicure 24 from CVC Chemicals) or Toluene-2,4-bis (N,N'-dimethyl urea) (such as Omicure U-24 from CVC Chemicals); amine-epoxy adducts and/or an aromatic amine such as bis(3-aminopropyl)-piperazine (BAPP) (available from BASF).

Catalysts may be added as an optional component to speed up the curing/crosslinking of the thermoset resins or to enable curing at lower temperatures. Solid, water-dispersible catalysts may be added when a particular curing agent is not sufficiently active at the primer composition's heating temperature to effect cure of the primer composition. For example, where a curing agent is active at 350° F., a catalyst is added to enable curing at around 250° F. The catalyst may be water soluble or water insoluble, and may be in particulate form having a particle size such that essentially 100 percent of the particles have a mean diameter of less than about 30 μm. The mean diameter of the particles can be measured by laser light scattering/diffraction method using instruments such as Malvern Mastersizer 2000 and Horiba LA-910. Typical catalysts that may be employed include, but are not limited to: bisureas, blocked imidazoles, substituted imidazoles or other blocked amines such as amine/epoxy adducts, hydrazines, etc.

The curing agent(s), solely or in combination with one or more catalyst(s), may be present in amounts from about 2 to 30 parts per 100 parts of the epoxy resin in total (i.e. total amount of epoxy or epoxies).

Silane Compounds

The silane compound in the water-based primer composition has silane functional groups that can react or bond to the material to be bonded to a metallic surface. Suitable silane compounds include organosilanes. Organosilanes having hydrolyzable groups are preferred. In certain embodiments, the organsilanes have the following general formula:

$$R_1-\underset{\underset{X}{|}}{\overset{\overset{R_2}{|}}{Si}}-\left[O\underset{\underset{R_2}{|}}{\overset{\overset{R_2}{|}}{Si}}\right]_n-R_2$$

wherein n is greater than or equal to 0; wherein each X is OH, OCH$_3$, and OCH$_2$H$_5$; wherein R$_1$ is CH=CH$_2$,

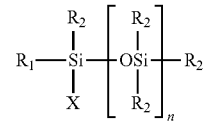

or CH$_2$—CH$_2$—CH$_2$—Y, wherein Y is NH$_2$, SH, OH, NCO, NH—CO—NH$_2$, NH—(CH$_2$)$_3$NH$_2$, NH-Aryl,

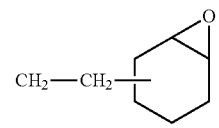

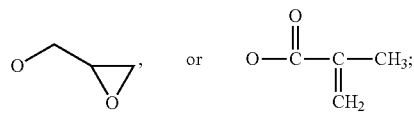

and wherein each R$_2$ is alkyl, alkoxy, aryl, substituted aryl, or R$_1$.

Examples of suitable, commercially available organosilane compounds are those available from OSi Specialties Inc., Danbury, Conn. including, but are not limited to, A-186, a beta-(3,4-epoxycyclo hexyl)ethyltrimethoxy silane; A-187, a gamma-glycidoxypropyltrimethoxysilane; A-189, a gamma-mercaptopropyltrimethoxysilane; A-1100, a gamma-aminopropyltriethoxysilane; A-1106, an aminoalkyl silicone solution; A-1170, a bis-(gamma-trimethoxysilylpropyl)amine; Y-9669, a N-phenyl-gamma-aminopropyl-trimethoxysilane; Y-11777, an amino alkyl silicone/water solution; and Y-11870, an epoxy functional silane solution. Other suitable commercially available organosilanes include, but are not limited to, Z-6040, a gammaglycidoxypropyl-trimethoxy silane from Dow Corning, Midland, Mich., HS2759, an aqueous epoxy functional silane; HS2775, an aqueous amino silane solution; and HS2781 an aqueous oligomeric silane solution with amino and vinyl groups all sold by Huls America Inc., N.J. Another example is 3-glycidoxypropylmethoxy-silane, which is sold under the trademark Z-6040.

Generally, the organosilane is present in the water-based primer composition in amounts ranging from about 0.01 to 15 parts per 100 parts of water, preferably from about from about 0.1 to 10 parts per 100 parts of water.

The organosilane may be in a liquid or powder form that can be added directly to the water-based primer composition.

Optional Additives

The water-based primer composition may optionally contain conventional dyes, pigments, and rheology modifiers. The total amount of such optional additives is less than 3 wt. %, for example, 0.1 wt. % to 2 wt. %. A benefit of compositions containing dyes or pigments is that the surface coverage can be assessed more easily by visual methods. Inorganic fillers, in particulate form, may be added in order to control the rheology of the composition for coating application. Suitable inorganic fillers include fumed silica, clay particles, and the like.

According to one embodiment, the primer composition is an aqueous dispersion containing:
(i) 20-60 wt. % one or more epoxy resin(s);
(ii) 2-30 parts curing agent(s), solely or in combination with catalyst(s), per 100 parts of epoxy resin(s) in total;
(iii) organosilane in an amount of 0.1 to 10 parts per 100 parts of water;
(iv) 0.1-5 wt. % carbon-based material selected from graphene platelets, graphite platelets, carbon black powder, carbon nanotubes, and combination thereof, based on total solid components in the aqueous composition;
(v) less than 15 wt. % propylene carbonate;
(vi) optionally, 0.1-2 wt. % rheology modifier and/or pigment/dyes;
(vii) water to provide 10%-30% solids,
where "wt %" represents weight percentage based on the total weight of the composition unless indicated otherwise.

EXAMPLES

Example 1

Primer Formulations 1 and 2 were prepared according to the formulation disclosed in Table 1.

TABLE 1

| Components | Formulation 1 Amount | Formulation 2 Amount |
|---|---|---|
| Bisphenol A epoxy (dispersion with 55% solids) | 49 gms | 49 gms |
| Solid epoxy novolac resin | 6 gms | 6 gms |
| Solid Bisphenol A-based epoxy (powder) | 8 gm | 8 gm |
| 2,2-Bis-4-(4-aminophenoxy) phenyl propane (BAPP) | 6 gms | 6 gms |
| Toluene-2,4-bis (N,N'-dimethyl urea) | 2 gms | 2 gms |
| Paliotol Yellow (pigment) | 0.3 gms | 0.3 gms |
| Graphene (corrosion inhibitor) | — | 0.5 gms |
| Fumed silica | 0.1 gms | 0.1 gms |
| Organosilane (gamma-glycidoxypropyltrimethoxy silane) | 1 wt % of total water amount | 1 wt % of total water amount |
| Mergal K10N (biocide) | 0.1 wt % of composition | 0.1 wt % of composition |
| Propylene carbonate | 7.5 gms | 7.5 gms |
| Deionized (DI) water | To provide 20 wt % solids | To provide 20 wt % solids |

Each of the primer formulations was sprayed onto surface treated Al-2024 Bare alloy panel using HVLP (high velocity low pressure) gun to form a film having 0.2 mil thickness. The surface treatment was according to ASTM D 2651, which includes cleaning, FPL etching and PAA anodization. The resulting uncured films were left to dry by air at ambient temperature. The primer formulations were then cured at 250° F. for 1 hour and subjected to following tests: a) scribe corrosion tests (ASTM D 1654) after 1000 to 3000 hours of salt fog exposure (ASTM B 117); b) single lap shear test (ASTM D1002) with an epoxy-based adhesive FM 73 from Cytec Engineered Materials Inc.; and c) floating roller peel test (ASTM D3167) with FM 73 adhesive.

Figure 1B:
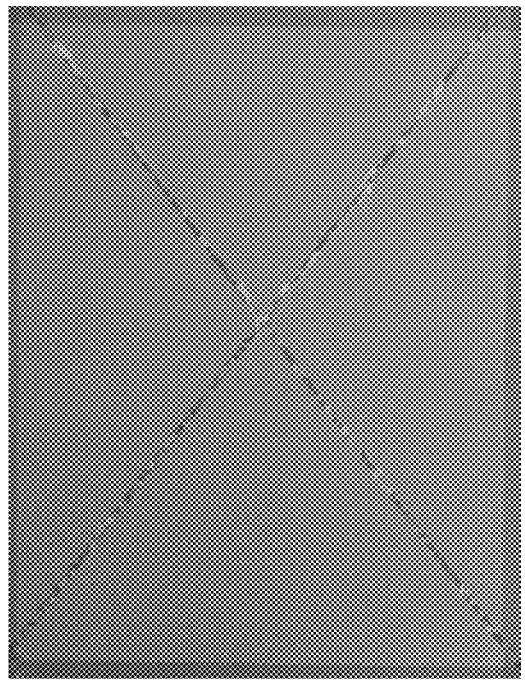

In the above water-based bonding primer composition (Formulation 2), the graphene platelets were homogeneously dispersed. Formulation 2 provided an excellent barrier to moisture and oxygen diffusion, thereby significantly improving the long term (3000 hours) corrosion performance of aluminum substrates as compared with the control non-chromate, water-based bonding primer (Formulation 1). FIG. 1A shows the result from using Formulation 1 in a 3000-hour scribe corrosion test (ASTM D1654). FIG. 1B shows the result from using Formulation 2 in the same corrosion test.

The corrosion test results indicate a unique synergistic effect of epoxy-based primer composition and dispersed graphene platelets acting in a way to block the diffusion of moisture and corrosion caused by salt. The results show that the primer coating based on the graphene-containing, non-chromate formulation can provide a long term anti-corrosion performance.

Furthermore, it was found that the modification of epoxy primer compositions with graphene did not compromise any of the properties of bonding primers as indicated by good sprayability, handling properties, mechanical performance, and shelf life. Table 2 shows the test results for Formulation 2, which contained graphene nanoplatelets. It was found that the graphene-containing aqueous bonding primer Formulation 2 exhibited excellent mechanical properties, especially toughness (particularly, floating roller peel strength) at low temperature.

TABLE 2

| | −67° F. (−55° C.) | 75° F. (24° C.) | 180° F. (82° C.) |
|---|---|---|---|
| Single Lap Shear, psi | 6528 | 6517 | 4685 |
| Floating Roller Peel, pli | 56 | 84 | 79 |

Example 2

Primer Formulations 3 and 4 were prepared according to the formulation disclosed in Table 3 using zinc phosphate-based corrosion inhibitor, a conventional corrosion inhibitor.

TABLE 3

| Components | Formulation 3 Amount | Formulation 4 Amount |
|---|---|---|
| Bisphenol A epoxy (dispersion with 55% solids) | 49 gms | 49 gms |
| Solid epoxy novolac resin | 6 gms | 6 gms |
| Solid Bisphenol A-based epoxy (powder) | 8 gm | 8 gm |
| 2,2-Bis-4-(4-aminophenoxy) phenyl propane (BAPP) | 6 gms | 6 gms |
| Toluene-2,4-bis (N,N'-dimethyl urea) | 2 gms | 2 gms |
| Paliotol Yellow (pigment) | 0.3 gms | 0.3 gms |
| Zinc phosphate-based corrosion inhibitor | 7.3 gms | 2.4 gms |
| Fumed silica | 0.1 gms | 0.1 gms |
| Organosilane (gamma-glycidoxypropyltrimethoxy silane) | 1 wt % of total water amount | 1 wt % of total water amount |
| Mergal K10N (biocide) | 0.1 wt % of composition | 0.1 wt % of composition |
| Propylene carbonate | 7.5 gms | 7.5 gms |
| Deionized (DI) water | To provide 20 wt % solids | To provide 20 wt % solids |

For comparison, Formulations 3 and 4 were formulated by adding different loadings of zinc phosphate-based corrosion inhibitor to the same non-chromated, water-based Formulation 1 shown in Table 1. Each primer formulation was sprayed onto a surface treated Al alloy panel then cured as described in Example 1. The same 3000-hr hour scribe corrosion test (ASTM D 1654) was carried out on the cured primer coatings. Significant corrosion signs including pitting and whitish stripes were observed for the primer coating based on Formulation 3. Several pitting spots and stripes were also present for the primer coating based on Formulation 4. It can be seen that Formulation 2 (in Example 1), which contained a small amount of graphene nanoplatelets, showed superior long term corrosion performance relative to primer coatings based on Formulation 3 and 4, which contained the conventional zinc-phosphate corrosion inhibitor.

Example 3

Primer Formulations 5 and 6 were prepared according to the formulation disclosed in Table 4 using Zinc/Cerium molybdates-based corrosion inhibitor, a conventional corrosion inhibitor.

TABLE 4

| Components | Formulation 5 Amount | Formulation 6 Amount |
|---|---|---|
| Bisphenol A epoxy (dispersion with 55% solids) | 49 gms | 49 gms |
| Solid epoxy novolac resin | 6 gms | 6 gms |
| Solid Bisphenol A-based epoxy (powder) | 8 gm | 8 gm |
| 2,2-Bis-4-(4-aminophenoxy) phenyl propane (BAPP) | 6 gms | 6 gms |
| Toluene-2,4-bis (N,N'-dimethyl urea) | 2 gms | 2 gms |
| Paliotol Yellow (pigment) | 0.3 gms | 0.3 gms |
| Zinc/Cerium molybdates-based corrosion inhibitor | 7.3 gms | 2.4 gms |
| Fumed silica | 0.1 gms | 0.1 gms |
| Organosilane (gamma-glycidoxypropyltrimethoxy silane) | 1 wt % of total water amount | 1 wt % of total water amount |
| Mergal K10N (biocide) | 0.1 wt % of composition | 0.1 wt % of composition |
| Propylene carbonate | 7.5 gms | 7.5 gms |
| Deionized (DI) water | To provide 20 wt % solids | To provide 20 wt % solids |

Formulation 5 and 6 were formulated by adding Zinc/Cerium molybdates at two different loading levels to the same non-chromated, water-based Formulation 1 disclosed in Table 1. Each primer formulation was sprayed onto a surface treated Al alloy panel then cured as described in Example 1. The same 3000-hr hour scribe corrosion test (ASTM D 1654) was carried out on the cured primer coatings. Both primer coatings formed from Formulations 5 and 6 showed some spots of whitish stripes along the scribe lines after the 3000-hr scribe corrosion test.

Primer coatings based on Formulations 1-6 (produced according to Examples 1-3) were subjected to floating roller peel test at −67° F. and wedge crack test (ASTM D 3762). Table 5 provides the results and the performance ratings for all primer coatings tested. Rating 5 is the highest.

TABLE 5

Performance results and ratings.

| | Dry film appearance | 1000 hour Scribe corrosion (level 1-5) | 3000 hour Scribe corrosion (level 1-5) | Floating roller peel test at −67° F. (level 1-5) | Wedge crack test (level 1-5) |
|---|---|---|---|---|---|
| Control (Formulation 1) | Smooth and adherent | 5 | 2 | 5 | 5 |
| Formulation 2 | Smooth and adherent | 5 | 5 | 5 | 5 |
| Formulation 3 | Smooth-like and adherent | 5 | 1 | 4 | 3 |
| Formulation 4 | Smooth and adherent | 5 | 3 | 5 | 4 |
| Formulation 5 | Smooth-like and adherent | 5 | 3 | 4 | 4 |
| Formulation 6 | Smooth and adherent | 5 | 3 | 5 | 4 |

These results show the advantage of using a small amount of graphene nanoplatelets to achieve long term corrosion performance as compared to other common corrosion inhibitors—zinc phosphate-based inhibitor and Zinc/Cerium molybdates.

Figure 2:
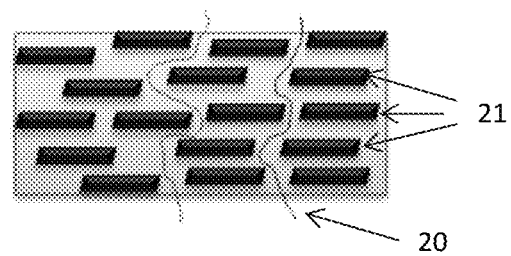
FIG. 2 schematically illustrates the tortuosity mechanism in a graphene-containing primer coating.

As illustrated by FIG. 2, it is believed that the tortuosity mechanism 20 created by the nanoplatelets 21 in the graphene-containing primer coating of the present disclosure yields a good barrier to moisture and gas diffusion/penetration for the primer coating. And it is believed that this tortuosity mechanism provides the superior long term corrosion performance comparable to the other conventional chromated primer coatings.

Terminology

In the present disclosure, the modifier "approximately" and "about" used in connection with a quantity is inclusive of the stated value and has the meaning dictated by the context, (e.g., includes the degree of error associated with measurement of the particular quantity). For example, a number following "about" can mean the recited number plus or minus 0.1% to 1% of that recited number. The suffix "(S)" as used herein is intended to include both the singular and the plural of the term that it modifies, thereby including one or more of that term (e.g., the metal(s) includes one or more metals). Ranges disclosed herein are inclusive of the endpoints and all intermediate values of the ranges, for example, "1% to 10%" includes 1%, 1.5%, 2%, 2.5%, 3%, 3.5%, etc.

What is claimed is:

1. A bonding method comprising:
   (a) applying an aqueous primer composition onto a surface of a metallic substrate to form a curable primer film, the aqueous primer composition having a solid content of 10%-30% and comprising:
  i. one or more epoxy resins;
  ii. at least one curing agent;
  iii. a silane compound having at least one hydrolyzable group;
  iv. graphene platelets having planar dimensions (length and width) in the range of 0.1 to 100 μm and an oxygen content of 1%-20%; and
  v. water;
(b) adhesively joining the metallic substrate to a second substrate whereby a curable adhesive is positioned between the primer film and the second substrate; and
(c) curing the adhesive to form a bonded structure.

2. The bonding method of claim 1, wherein the amount of graphene platelets is less than 5% by weight based on the combined weight of components (i), (ii) and (iv).

3. The bonding method according to claim 1, further comprising less than 15% by weight of propylene carbonate based on the total weight of the primer composition.

4. The bonding method according to claim 1, wherein the aqueous primer composition is applied at (a) by spraying.

5. The bonding method according to claim 1, wherein the amount of graphene platelets is 0.1 wt. % to 2 wt. % based on the combined weight of components (i), (ii) and (iv).

6. The bonding method according to claim 1, wherein the second substrate is another metallic substrate.

7. The bonding method according to claim 6, wherein the second substrate is formed of aluminum or aluminum alloy.

8. The bonding method according to claim 1, wherein the second substrate is a composite substrate comprising reinforcement fibers embedded in a polymer or matrix resin.

9. The bonding method of claim 8, wherein the composite substrate is uncured or partially cured when it is joined to the metallic substrate at step (b).

10. The bonding method of claim 8, wherein the composite substrate is fully cured when it is joined to the metallic substrate at step (b).

\* \* \* \* \*